3,122,540
2-ARYL-4,7-DIAMINO-N-(AMINOALKYL)-6-PTERIDINE-CARBOXAMIDES
Thomas S. Osdene, West Chester, Pa., assignor to American Home Products Corporation, New York, N.Y., a corporation of Delaware
No Drawing. Filed Aug. 9, 1962, Ser. No. 215,771
6 Claims. (Cl. 260—247.2)

This invention relates to new 2-aryl-4,7-diamino-N-(tertiary-aminoalkyl)-6-pteridinecarboxamides which have useful pharmacodynamic activity. The compounds of this invention have useful diuretic and natriuretic activity while being of very low toxicity. Compounds of this invention show marked anti-inflammatory action and antiviral activity. They are substantially devoid of antifolic acid activity. They are easily soluble in dilute acids, and may be administered as the free bases or as acid addition salts such as the sulfates, hydochlorides, hydrobromides, phosphates, citrates, tartrates, etc. They may be administered orally or parenterally.

The new pteridine derivatives of this invention have the structural formula

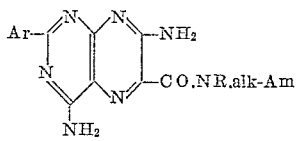

wherein Ar represents thienyl or a phenyl radical which is either unsubstituted or substituted once or twice by trifluoromethyl, lower alkyl, lower alkoxy, chlorine, bromine, or fluorine, R represents hydrogen or lower alkyl, alk represents a polymethylene radical which may be unsubstituted or substituted by lower alkyl and which contains from 2 to 4 carbon atoms in its chain between the points of attachment, and Am represents a tertiary amino radical containing no more than 8 carbon atoms and selected from the group consisting of dialkylamino, dialkanolamino, alkylalkanolamino, and cyclic amino radicals including morpholino, piperidino, pyrrolidino, and N-methylpiperazino. Where the expressions "lower alkyl" and "lower alkoxy" are used herein, it is intended that these signify alkyl or alkoxy radicals containing from 1 to 4 carbon atoms, preferably from 1 to 2.

In accordance with this invention, the novel pteridine compounds of this invention may be prepared conveniently by reaction of a 2-aryl-4,6-diamino-5-nitrosopyrimidine with an N-(tertiary-aminoalkyl)cyanoacetamide as represented graphically by the following partial equation.

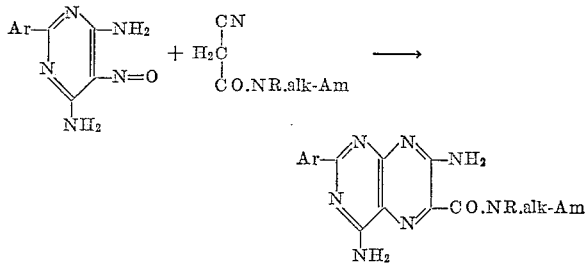

In these formulas, Ar, R, alk, and Am have meanings as given above. The above pteridine-forming reaction may be conveniently carried out by heating the said 2-aryl-4,6-diamino-5-nitrosopyrimidine and the said N-(tertiary-aminoalkyl)cyanoacetamide together, in approximately equimolar amounts, in an anhydrous polar, preferably hydroxylic, solvent in the presence of a catalytic amount of an alkaline condensing agent, such as an alkali metal alkoxide or an alkali metal alkoxyalkoxide. Temperatures of 50–200° C., preferably about 80–100° C., are suitable. Satisfactory solvents in which to conduct this reaction include methanol, ethanol, propanol, butanol, ethylene glycol monomethyl ether, ethylene glycol monoethyl ether, and dimethyl formamide. A preferred solvent is absolute ethanol and a preferred catalyst is sodium ethoxide. The reaction is unsually complete after a few minutes at 80–100° C.; on cooling the reaction mixture to room temperature the product can be recovered usually merely by filtration. In some instances it may be desirable to evaporate off part of the solvent to induce crystallization.

The N-(tertiary-amino)alkylcyanoacetamides referred to above are readily prepared by an amidation reaction between an alkyl cyanoacetate, e.g., ethyl cyanoacetate, and a tertiary-aminoalkylamine having the formula HNR.alk-Am wherein R, alk, and Am have the meanings previously recited.

The 2 - aryl - 4,7 - diamino - N - (tertiary - amino - alkyl)-6-pteridinecarboxamides of this invention are relatively high-melting, yellow, stable, crystalline solids. They are moderately soluble in most organic solvents, and show good solubility in dilute aqueous acids. The solubility of their acid-addition salts favors absorption of orally administered dosages.

Compositions for oral administration may be in the form of tablets, capsules, solutions or suspensions. The usual pharmaceutically acceptable extenders and carriers may be used such as corn starch, lactose, methyl cellulose, and carboxymethyl cellulose and its salts. Other substances such as solubilizing agents, buffers, and preservatives are also contemplated, particularly in the case of liquid preparations. The dosage range of active substance is usually in the range of about 50 to 500 mg. per day, and this amount may be administered in a single dose or in a plurality of doses.

The following examples illustrate the preparation of certain intermediates useful in the practise of this invention.

EXAMPLE A

2-Cyano-N-(2-Diethylaminoethyl)Acetamide

A mixture of 22.6 g. of ethyl cyanoacetate, 23.2 g. of N,N-diethylethylenediamine and 50 ml. of ethanol was stirred at room temperature for 30 minutes during which time the mixture evolved heat and turned brown. The solution was then boiled under reflux for 2 hours after which time the solvent was removed on a rotary evaporator. The residual oil was subjected to a high vacuum distillation, and the fraction, B.P. 132°/0.6 mm. was collected. One obtained 19 g. of 2-cyano-N-(2-diethylaminoethyl)-acetamide as a viscous oil.

Analysis.—Calculated: C, 58.98; H, 9.35; N, 22.93.
Found: C, 58.56; H, 9.26; N, 22.67.

EXAMPLE B

2-Cyano-N-(2-Morpholinoethyl)Acetamide

A mixture of 65 g. of N-(2-aminoethyl)morpholine, 56.5 g. of ethyl cyanoacetate and 100 ml. of absolute ethanol were boiled under reflux for 4 hours. The solvent was removed on a rotary evaporator when a dark oil resulted, wt.=94 g. On standing the oil solidified and recrystallization from ethyl acetate afforded 2-cyano-N-(2-morpholinoethyl)acetamide, M.P. 85°.

Analysis.—Calculated: C, 54.80; H, 7.67; N, 21.31.
Found: C, 55.05; H, 7.83; N, 21.27.

EXAMPLE C

2-Cyano-N-(2-Piperidinoethyl)Acetamide

To a solution of 32 g. of 2-piperidinoethylamine in 100 ml. of absolute ethanol was added 29 g. of ethyl cyanoacetate. Heat was evolved and the mixture was boiled under reflux for 2 hours. After removal of the solvent the resulting oil rapidly solidified. Recrystallization from ethyl acetate afforded 2-cyano-N-(2-piperidinoethyl)acetamide, M.P. 70°.

*Analysis.*—Calculated: C, 61.51; H, 8.78; N, 21.52. Found: C, 61.80; H, 8.97; N, 21.49.

In the same manner as carried out above the following cyano compounds useful as intermediates were also prepared:

(1) 2-cyano-N-(2-dimethylaminoethyl)acetamide, oil, B.P. 147° C./1.0 mm.
(2) 2-cyano-N-(2-di-isopropylaminoethyl)acetamide, oil, B.P. 150° C./0.7 mm.
(3) 2-cyano-N-methyl-N-(2-dimethylaminoethyl)-acetamide, oil, B.P. 147° C./0.7 mm.
(4) 2-cyano-N-ethyl-N-(2-dimethylaminoethyl)-acetamide, oil, B.P. 147–150° C./0.7 mm.
(5) 2-cyano-N-(3-dimethylaminopropyl)acetamide, oil, B.P. 128–129° C./0.5 mm.
(6) 2-cyano-N-(3-diethylaminopropyl)acetamide, oil, B.P. 142–143° C./0.5 mm.
(7) 2-cyano-N-(3-di-n-butylaminopropyl)acetamide, oil, B.P. 184° C./1.0 mm.
(8) 2-cyano-N-(2-dimethylaminopropyl)acetamide, oil, B.P. 138° C./1.1 mm.
(9) 2-cyano-N-(3-morpholinopropyl)acetamide, colorless crystals from ethyl acetate-petroleum ether, melting at 60° C.
(10) 2-cyano-N-(2-pyrrolidinoethyl)acetamide, colorless crystals from ethyl acetate, M.P. 108° C.
(11) 2-cyano-N-(bis-[2-hydroxyethyl]aminoethyl) acetamide, uncrystallized oil; monopicrate, M.P. 83–84° C.
(12) 2-cyano-N-(4-diethylamino-1-methylbutyl)acetamide; oil, used without further purification.
(13) 2-cyano-N-(4-dimethylaminobutyl)acetamide; oil, used without further purification.

EXAMPLE D

4,6-Diamino-5-Nitroso-2-(o-Tolyl)Pyrimidine

To a stirred solution of 17.1 g. of o-toluamidine hydrochloride in 50 ml. of methanol was added 22.2 g. of the silver salt of isonitrosomalononitrile in small portions, and the resulting mixture was stirred for 1 hour at room temperature. After filtration, the filtrate was evaporated to dryness to give the o-toluamidine salt of isonitrosomalononitrile, which after recrystallization from ethyl acetate had a M.P. 127–128°.

Six grams of the above salt was boiled under reflux with 30 ml. of 5-ethyl-2-methylpyridine for 15 minutes. On cooling and addition of petroleum ether there was obtained 5.78 g. of the green pyrimidine derivative. Recrystallization from ethanol afforded 4,6-diamino-5-nitroso-2-(o-tolyl)pyrimidine, M.P. 219–220° (decomp.).

*Analysis.*—Calculated: C, 57.63; H, 4.84; N, 30.54. Found: C, 57.87; H, 5.00; N, 31.44.

EXAMPLE E

4,6-Diamino-2-(3,4-Dichlorophenyl)-5-Nitroso-Pyrimidine

To a stirred solution of 5.0 g. of 3,4-dichlorobenzamidine hydrochloride in 100 ml. of methanol was added in small portions 7.0 g. of the silver salt of isonitrosomalononitrile, and the mixture was stirred for 1 hour. After filtration, the filtrate was evaporated to dryness in vacuo to give the 3,4-dichlorobenzamidine salt of isonitrosomalononitrile, M.P. 180°.

Ten grams of the above salt were boiled under reflux with 50 ml. of 5-ethyl-2-methylpyridine for 15 minutes. After cooling and treating with petrol a green precipitate was obtained. Recrystallization from 2-ethoxyethanol yielded 4,6-diamino-2-(3,4-dichlorophenyl)-5-nitroso-pyrimidine, M.P. 279–280° (decomp.).

*Analysis.*—Calculated: C, 42.29; H, 2.49; N, 24.65; Cl, 24.96. Found: C, 42.53; H, 4.75; N, 24.40; Cl, 25.0.

The following examples illustrate preparation of the novel pteridine compounds of this invention:

EXAMPLE 1

4,7-Diamino-N-(2-Morpholinoethyl)-2-Phenyl-6-Pteridinecarboxamide

To a solution of 0.2 g. of sodium in 500 ml. of absolute ethanol was added 6.45 g. of 4,6-diamino-5-nitroso-2-phenylpyrimidine and the mixture was stirred and boiled under reflux for 5 minutes. This was followed by the addition of 6.5 g. of 2-cyano-N-(2-morpholinoethyl)acetamide, when within 3 minutes a yellow precipitate was deposited. After refluxing for a total of 15 minutes the mixture was cooled and the precipitate was removed by filtration, wt.=8.65 g., M.P. 281° C. Recrystallization from aqueous 2-ethoxyethanol afforded 4,7-diamino-N-(2-morpholinoethyl)-2-phenyl-6-pteridinecarboxamide, M.P. 281° C.

*Analysis.*—Calculated: C, 57.85; H, 5.62; N, 28.41. Found: C, 58.14; H, 5.76; N, 28.22.

EXAMPLE 2

2-Phenyl-4,7-Diamino-N-(2-Diethylaminoethyl)-6-Pteridinecarboxamide

To a solution of 0.2 g. of sodium in 500 ml. of absolute ethanol was added 6.45 g. of 4,6-diamino-5-nitroso-2-phenylpyrimidine, followed by 6 g. of 2-cyano-N-(2-diethylaminoethyl)acetamide. The mixture was stirred and heated to boiling point when a deep green solution was obtained which turned yellow after two minutes. After a total reflux time of 10 minutes the bulk of the solvent was removed and a yellow crystalline material was deposited. This was removed by filtration and dried, wt.=11.4 g. Recrystallization from ethanol afforded 2-phenyl-4,7-diamino-N-(2-diethylaminoethyl)-6-pteridinecarboxamide, M.P. 280–281° C.

*Analysis.*—Calculated: C, 59.98; H, 6.36; N, 29.46. Found: C, 60.11; H, 6.46; N, 29.25.

EXAMPLE 3

4,7-Diamino-2-Phenyl-N-(2-Piperidinoethyl)-6-Pteridinecarboxamide

To a solution of 0.2 g. of sodium in 500 ml. of ethanol was added 6.45 g. of 4,6-diamino-5-nitroso-2-phenylpyrimidine and the mixture was stirred and refluxed for 5 minutes. This was followed by the addition of 6.44 g. of 2-cyano-N-(2-piperidinoethyl)acetamide and the whole was boiled for 30 minutes. After 3 minutes the solution became lighter in color. On cooling a brown material was obtained, wt.=6.6 g., M.P. 283° C. and a further 3.5 g. of material was recovered from the mother liquor. Recrystallization from aqueous dimethylformamide afforded 4,7-diamino-2-phenyl-N-(2-piperidinoethyl)-6-pteridinecarboxamide, M.P. 284° C.

*Analysis.*—Calculated: C, 61.20; H, 6.16; N, 28.55. Found: C, 61.08; H, 5.90; N, 28.62.

EXAMPLE 4

2-(p-Chlorophenyl)-4,7-Diamino-N-(2-Diethylaminoethyl)-6-Pteridinecarboxamide To a solution of 0.2 g. of sodium in 500 ml. of absolute ethanol was added 7.49 g. of 4,6-diamino-2-(p-chlorophenyl)-5-nitrosopyrimidine and the mixture was stirred and boiled under reflux. This was followed by the addition of 6.04 g. of 2-cyano-N-(2-diethylaminoethyl)acetamide and boiling was continued for 45 minutes. After 10 minutes a precipitate was deposited out of solution, which was removed by filtration after completion of the reaction, wt.=8.8 g., M.P. 307° C. Recrystallization from aqueous 2-ethoxyethanol afforded 2-(p-chlorophenyl)-4,7-diamino-N-(2-diethylaminoethyl)-6-pteridinecarboxamide, monohydrate, M.P. 309° C.

*Analysis.*—Calculated: C, 52.71; H, 5.82; N, 25.89; Cl, 8.19. Found: C, 52.53; H, 5.95; N, 25.94; Cl, 7.86.

EXAMPLE 5

2-(p-Tolyl)-4,7-Diamino-N-(2-Diethylaminoethyl)-6-Pteridinecarboxamide

To a solution of 0.2 g. of sodium in 500 ml. of absolute ethanol was added 6.87 g. of 4,6-diamino-5-nitroso-2-(p-tolyl)pyrimidine, followed by 6.0 g. of 2-cyano-N-(2-diethylaminoethyl)acetamide. The mixture was stirred mechanically and boiled under reflux for 1 hour. After removal of the bulk of solvent and cooling, there was obtained a yellow precipitate, wt.=11.0 g., M.P. 279° C. Recrystallization from aqueous ethanol afforded 2-(p-tolyl) - 4,7-diamino-N-(2-diethylaminoethyl)-6-pteridinecarboxamide, M.P. 284° C.

*Analysis.*—Calculated: C, 60.89; H, 6.64; N, 28.41. Found: C, 60.92; H, 6.59; N, 28.32.

In manner similar to the methods exemplified in Examples 1–5, other pteridines were made as indicated in the following table. In each case, the reaction was carried out in absolute ethanol in which there had been dissolved about 0.04% by weight of sodium metal, thereby providing a catalytic quantity of sodium ethoxide.

| Name | Recrystallization from— | M.P., °C. |
|---|---|---|
| 2-Phenyl-4,7-diamino-N-(3-dimethylaminopropyl)-6-pteridinecarboxamide. | Ethanol | 281–282 |
| 2-Phenyl-4,7-diamino-N-(2-dimethylaminoethyl)-6-pteridinecarboxamide. | 2-Ethoxyethanol | 294 |
| 2-Phenyl-4,7-diamino-N-ethyl-N-(2-dimethylaminoethyl)-6-pteridinecarboxamide. | 50% Aqueous ethanol | 219 |
| 2-Phenyl-4,7-diamino-N-(2-dimethylaminopropyl)-6-pteridinecarboxamide. | Aqueous 2-ethoxyethanol. | 286–287 |
| 2-Phenyl-4,7-diamino-N-(2-di-isopropylaminoethyl)-6-pteridinecarboxamide. | ---do--- | 283 |
| 2-Phenyl-4,7-diamino-N-methyl-N-(2-dimethylaminoethyl)-6-pteridinecarboxamide. | Ethanol | 234 |
| 2-Phenyl-4,7-diamino-N-(3-di-n-butylaminopropyl)-6-pteridinecarboxamide. | ---do--- | 260 |
| 2-Phenyl-4,7-diamino-N-(3-diethylaminopropyl)-6-pteridinecarboxamide. | ---do--- | 272–273 |
| 2-(p-Tolyl)-4,7-diamino-N-(2-dimethylaminopropyl)-6-pteridinecarboxamide. | Aqueous ethanol | 307 |
| 2-Phenyl-4,7-diamino-N-(3-morpholinopropyl)-6-pteridinecarboxamide. | Ethanol | 260 |
| 2-(p-Chlorophenyl)-4,7-diamino-N-(3-diethylaminopropyl)-6-pteridinecarboxamide. | Aqueous ethanol | 306 |
| 2-(o-Tolyl)-4,7-diamino-N-(2-diethylaminoethyl)-6-pteridinecarboxamide. | ---do--- | 277 |
| 2-Phenyl-4,7-diamino-N-(2-pyrrolidinoethyl(-6-pteridinecarboxamide. | Ethanol | 297 |
| 2-(p-Tolyl)-4,7-diamino-N-(3-dimethylaminopropyl)-6-pteridinecarboxamide. | Aqueous ethanol | 300 |
| 2-(o-Tolyl)-4,7-diamino-N-(2-dimethylaminoethyl)-6-pteridinecarboxamide. | Ethanol | 275 |
| 2-(p-Methoxyphenyl)-4,7-diamino-N-(2-dimethylaminoethyl)-6-pteridinecarboxamide. | ---do--- | 297 |
| 2-(o-Tolyl)-4,7-diamino-N-methyl-N-(2-dimethylaminoethyl)-6-pteridinecarboxamide. | Aqueous dimethylformamide. | 215 |
| 2-(p-Methoxyphenyl)-4,7-diamino-N-(2-diethylaminoethyl)-6-pteridinecarboxamide. | Aqueous 2-ethoxyethanol. | 283 (hemihydrate). |
| 2-(o-Tolyl)-4,7-diamino-N-(2-morpholinoethyl)-6-pteridinecarboxamide. | ---do--- | 273 |
| 2-(p-Chlorophenyl)-4,7-diamino-N-(2-morpholinoethyl)-6-pteridinecarboxamide. | Aqueous ethanol | 318 |
| 2-(p-Tolyl)-4,7-diamino-N-(2-morpholinoethyl)-6-pteridinecarboxamide. | Aqueous 2-ethoxyethanol. | 309 |
| 2-(p-Methoxyphenyl)-4,7-diamino-N-(2-morpholinoethyl)-6-pteridinecarboxamide. | ---do--- | 313 |
| 2-(3,4-Dichlorophenyl)-4,7-diamino-N-(2-diethylaminoethyl)-6-pteridinecarboxamide. | Ethanol | 304 |
| 2-Phenyl-4,7-diamino-N-(2-[bis-(2-hydroxyethyl)-aminoethyl)-6-pteridine-carboxamide. | Aqueous ethanol | 239–240 |
| 2-Phenyl-4,7-diamino-N-(4-diethylamino-1-methylbutyl)-6-pteridinecarboxamide. | ---do--- | 268 |
| 2-Phenyl-4,7-diamino-N-(4-dimethylaminobutyl)-6-pteridinecarboxamide. | Ethanol | 273 |

EXAMPLE 6

*2-(2'-Thienyl)-4,7-Diamino-N-(2-Diethylaminoethyl)-6-Pteridinecarboxamide*

By reacting 6.63 g. of 4,6-diamino-5-nitroso-2-(2'-thienyl)pyrimidine with 6.0 g. of 2-cyano-N-(2-diethylaminoethyl)acetamide in 500 ml. of absolute ethanol containing 0.2 g. of sodium as in Example 2, 2-(2'-thienyl) - 4,7 - diamino-N-(2-diethylaminoethyl)-6-pteridinecarboxamide is obtained.

EXAMPLE 7

*2-(3'-Thienyl)-4,7-Diamino-N-(2-Morpholinoethyl)-6-Pteridinecarboxamide*

By reacting 6.63 g. of 4,6-diamino-5-nitroso-2-(3'-thienyl)pyrimidine with 6.5 g. of 2-cyano-N-(2-morpholinoethyl)acetamide in 500 ml. of absolute ethanol containing 0.2 g. of sodium as in Example 1, 2-(3'-thienyl)-4,7-diamino-N-(2-morpholinoethyl)-6-pteridinecarboxamide is obtained.

EXAMPLE 8

*2-(p-Fluorophenyl)-4,7-Diamino-N-(3-Diethylaminopropyl)-6-Pteridinecarboxamide*

By reaction of 7.0 g. of 4,6-diamino-2-(p-fluorophenyl)-5-nitrosopyrimidine with 6.5 g. of 2-cyano-N-(3-diethylaminopropyl)acetamide in 500 ml. of absolute ethanol containing 0.2 g. of sodium as in Example 2, 2-(p-fluorophenyl)-4,7-diamino-N-(3 - diethylaminopropyl)-6-pteridinecarboxamide is obtained.

EXAMPLE 9

*2-(m-Bromophenyl)-4,7-Diamino-N-(2-Dimethylaminoethyl)-6-Pteridinecarboxamide*

By reaction of 8.82 g. of 4,6-diamino-2-(m-bromophenyl)-5-nitrosopyrimidine with 5.1 g. of 2-cyano-N-(2-dimethylaminoethyl)acetamide in 500 ml. of absolute ethanol containing 0.2 g. of sodium as in Example 2, 2-(m-bromophenyl)-4,7-diamino-N-(2-dimethylaminoethyl) - 6-pteridinecarboxamide is obtained.

EXAMPLE 10

*2-(m-Trifluoromethylphenyl)-4,7-Diamino-N-(2-Diethylaminoethyl)-6-Pteridinecaraboxamide*

By reaction of 8.50 g. of 4,6-diamino-5-nitroso-2-(m-trifluoromethylphenyl)pyrimidine with 6.0 g. of 2-cyano-N-(2-diethylaminoethyl)acetamide in 500 ml. of absolute ethanol containing 0.2 g. of sodium as in Example 2, 2-(m-trifluoromethylphenyl)-4,7-diamino-N-(2 - diethylaminoethyl)-6-pteridinecarboxamide is obtained.

EXAMPLE 11

*2-Phenyl-4,7-Diamino-N-[2-(Ethyl-2-Hydroxyethyl)-Aminoethyl]-6-Pteridinecarboxamide*

By reaction of 6.45 g. of 4,6-diamino-5-nitroso-2-phenylpyrimidine with 6.6 g. of 2-cyano-N-[2-(ethyl-2-hydroxyethyl)aminoethyl]acetamide in 500 ml. of absolute ethanol containing 0.2 g. of sodium as in Example 2, 2-phenyl-4,7-diamino-N-[2-(ethyl-2 - hydroxyethyl)aminoethyl]-6-pteridinecarboxamide is obtained.

EXAMPLE 12

*2-Phenyl-4,7-Diamino-N-[2-(4-Methylpiperazino)-Ethyl]-6-Pteridinecarboxamide*

By reaction of 6.45 g. of 4,6-diamino-5-nitroso-2-phenylpyrimiden with 7.0 g. of 2-cyano-N-[2-(4-methylpiperazino)ethyl]acetamide in 500 ml. of absolute ethanol containing 0.2 g. of sodium as in Example 3, 2-phenyl-4,7-diamino-N-[2-(4-methylpiperazino)ethyl] - 6-pteridinecarboxamide is obtained.

This application is a continuation-in-part of my copending application Serial No. 110,339, filed May 16, 1961, now abandoned.

I claim:
1. A compound having the formula

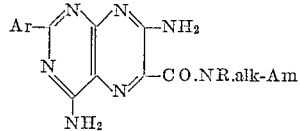

where Ar represents an aromatic radical selected from the group consisting of thienyl, phenyl, and phenyl bearing no more than two substituents selected from the group consisting of trifluoromethyl, lower alkyl, lower alkoxy, chlorine, bromine, and fluorine, R represents a member of the group consisting of hydrogen and lower alkyl, alk represents a member of the group consisting of polymethylene radicals containing from 2 to 4 carbon atoms in the chain between the points of attachment and such polymethylene radicals substituted by a lower alkyl radical, and Am represents a tertiary amino radical containing no more than 8 carbon atoms and selected from the group consisting of dialkylamino, dialkanolamino, alkylalkanolamino, morpholino, piperidino, pyrrolidino, and N-methylpiperazino.

2. 2-phenyl-4,7-diamino-N-(2-morpholinoethyl)-6-pteridinecarboxamide.
3. 2-phenyl-4,7-diamino-N-(2 - diethylaminoethyl) - 6-pteridinecarboxamide.
4. 2-phenyl-4,7-diamino-N-(2-piperidinoethyl)-6-pteridinecarboxamide.
5. 2-(p-chlorophenyl)-4,7-diamino-N-(2-diethylaminoethyl)-6-pteridinecarboxamide.
6. 2 - (p-tolyl)-4,7-diamino-N-(2-diethylaminoethyl)-6-pteridinecarboxamide.

References Cited in the file of this patent
UNITED STATES PATENTS

| | | |
|---|---|---|
| 2,759,934 | Speeter | Aug. 21, 1956 |
| 2,846,438 | Yale | Aug. 5, 1958 |
| 3,028,387 | Weinstock | Apr. 3, 1962 |